United States Patent Office 3,551,299
Patented Dec. 29, 1970

3,551,299
METHOD OF MINIMIZING POLYMER FORMATION DURING DISTILLATION OF VINYL ACETATE BY THE ADDITION OF ALPHA-METHYL STYRENE
Charles A. Defazio, Berkeley Heights, N.J., and Gene J. Fisher, Corpus Christi, Tex., assignors to Celanese Corporation, New York, N.Y., a corporation of Delaware
No Drawing. Filed Dec. 18, 1968, Ser. No. 784,929
Int. Cl. C07c 67/06
U.S. Cl. 203—8                        7 Claims

ABSTRACT OF THE DISCLOSURE

During the distillation of mixtures comprising vinyl acetate the formation of vinyl acetate polymer within the distillation column is minimized by incorporating alpha-methylstyrene into the liquid phase which is passing downwardly through the column.

---

This invention relates to the production of vinyl acetate, more particularly to the recovery and purification of vinyl acetate by distillation methods. Specifically it relates to means of preventing or minimizing the polymerization of vinyl acetate during distillation.

Various processes for producing vinyl acetate are known in the art, including the reaction of acetic acid with acetylene, the thermal decomposition of ethylidene diacetate, and the catalytic oxidation of ethylene in the presence of acetic acid. All these processes entail, at one stage or another, one or more distillation steps in which a mixture containing vinyl acetate and, usually, acetic acid or an ester such as ethyl acetate or methyl acetate is distilled for the purpose of recovering the vinyl acetate in a purified form. Each such distillation step is subject, however, to operating difficulties and product loss due to the fact that vinyl acetate is a reactive monomer which polymerizes easily, especially at the elevated temperatures encountered during distillation. Not only does polymerization result in a loss of product, but it also results in progressive fouling of the distillation column and its auxiliaries such as the reboiler and the residue draw-off connections.

Various steps are customarily taken to minimize polymerization during vinyl acetate distillation, including the incorporation into the vinyl acetate during distillation of hydroquinone, phenothiazine, or similar art-recognized polymerization inhibitors. The use of such inhibitors, however entails substantial expense since they are comparatively expensive and, when used, constitute an appreciable element in production cost of the vinyl acetate. The industry has, therefore, felt a need for an effective polymerization inhibitor for use in vinyl acetate distillation systems which would be less expensive than those compounds such as hydroquinone which have heretofore been recognized as being effective in such systems.

It is an object of this invention to provide a polymerization inhibitor for vinyl acetate distillation systems which is both effective and inexpensive. It is another object to provide a method for distilling vinyl acetate, while employing such an inhibitor, which is both effective and economical.

Other objects of the invention will be apparent from the following detailed description and examples.

In accordance with the present invention vinyl acetate-containing feedstocks are distilled with minimal polymerization of the vinyl acetate by incorporating into the liquid phase passing downwardly through the distillation column a quantity of alpha-methylstyrene. Even though alpha-methylstyrene is itself a vinyl monomer and therefore polymerizable, it has been discovered that when it is present in a distillation column in which vinyl acetate is being distilled, little or no polymerization of the vinyl acetate takes place and little or no fouling of the distillation column is experienced. The results obtained are as satisfactory as those obtained when using as inhibitor more expensive compounds such as hydroquinone. In addition, alpha-methylstyrene is relatively volatile, and therefore more effective than hydroquinone in preventing polymer deposition in, for instance, the condenser and the spaces under distillation trays.

Any of a number of modes of injecting the alpha-methylstyrene into the distillation column can be employed. It is recommended, however, from the standpoint of both simplicity and maximum effectiveness, that it be dissolved in the liquid which is employed as reflux for the distillation column and fed into the column at its head (i.e. on the top tray if the column be a tray-type column) commingled with the reflux. Alternatively the inhibitor, dissolved in any suitable solvent such as vinyl acetate, can be injected into the column at any location but preferably above the feed point. Injection at a lower location will, of course, provide some protection against polymerization (alpha-methylstyrene is, because of its volatility, superior to hydroquinone in this regard), but injection into the higher portions of the column provides maximum protection against fouling throughout the length of the column.

The quantity of alpha-methylstyrene to be incorporated into the liquid passing downwardly through the column is not critical. Concentrations as low as 5 p.p.m. are effective, but a concentration of about 25 parts per million by weight is recommended. Very satisfactory results have been obtained, for example, by dissolving the alpha-methylstyrene in the reflux being returned into the head of the column, in a concentration of about 100 p.p.m.

Temperature is not a critical factor in the application of the invention. Although it is desirable as a matter of course to avoid excessively high temperatures in the processing of any vinyl monomer, the incorporation of alpha-methyl-styrene into the distillation system eliminates or reduces polymerization at all temperatures at which vinyl acetate is distilled in ordinary industrial practice. For example, as will be pointed out in Example I to follow, beneficial results were obtained when employing the inhibitor at a process temperature of approximately 150° C.

The use of alpha-methylstyrene as polymerization inhibitor is broadly effective in distilling all vinyl acetate-containing mixtures which are encountered in the commercial processing of vinyl acetate. Specifically, however, it is effective and of particular industrial utility in the distillation of mixtures comprising vinyl acetate and acetic acid and those comprising mixtures of vinyl acetate with esters such as methyl and ethyl acetates. Water, which is frequently present particularly in the crude product initially recovered when vinyl acetate is produced by oxidizing ethylene in the presence of acetic acid, does not adversely affect the inhibiting action of the alpha-methylstyrene. Likewise acetaldehyde, also frequently present in these crude mixtures, has no adverse effect.

The following examples illustrate embodiments of the invention which are of particular value in the product recovery operations attendant upon the production of vinyl acetate by oxidizing ethylene catalytically in the presence of acetic acid. It will be recognized that these examples are given by way of illustration and that the use of the invention is not restricted to the distillation of the particular feedstocks the processing of which is being illustrated here.

EXAMPLE I

As described below, liquid feedstocks containing vinyl acetate and acetic acid were separated into a distillate comprising vinyl acetate and water and a residue comprising acetic acid and higher-boiling ethers in a 55-tray distillation column, operating under a pressure of 14 p.s.i.g. at the head and 17 p.s.i.g. at the base. Vapor temperature at the head was 77° C.; base temperature was 149° C. The distillate receiver was equipped to operate as a decanter in order to separate two liquid phases, one aqueous and one non-aqueous, which formed upon condensing the vapors withdrawn from the column. Of these two phases the lower, or aqueous, phase was continuously drawn off for further processing outside the scope of the invention. The upper, or organic, phase was divided continuously into two parts, one being returned to the top tray of the column as reflux and the other being drawn off as product.

The base of the column was provided with a reboiler system.

Two draw-off streams were withdrawn from the lower portion of the column, a liquid residue comprising predominantly acetic acid and high-boiling diol esters and a vapor sidestream withdrawn from the 15th tray from the bottom comprising predominantly acetic acid.

Two liquid feed streams were injected into the column. The first of these, comprising predominantly vinyl acetate and acetic acid withdrawn from a reaction system in which ethylene was being catalytically oxidized in the presence of acetic acid to produce vinyl acetate, was introduced into the column on the 42nd tray from the bottom. The second, comprising predominantly acetic acid containing lesser quantities of acetaldehyde, was introduced into the column on the 20th tray from the bottom. This second stream was related to vinyl acetate production only in that it was convenient to resolve it into acetaldehyde and acetic acid in the same column in which vinyl acetate and acetaldehyde were being separated from acetic acid.

In addition to the above-identified streams introduced into and withdrawn from the column, a stream of vinyl acetate containing alpha-methyl-styrene in solution was continuously introduced into the reflux stream prior to its introduction into the head of the column.

Flow rates into and out of the column were as follows:

| Stream designation: | Flow, U.S. gallons per min. per sq. ft. of cross-section |
|---|---|
| (1) Vinyl acetate-acetaldehyde onto tray 42 | 1.52 |
| (2) Acetaldehyde-acetic acid onto tray 20 | 0.25 |
| (3) Vinyl acetate solution of methylstyrene into reflux stream | 0.05 |
| (4) Reflux onto tray 55 | 2.02 |
| (5) Vinyl acetate withdrawn as product | 0.70 |
| (6) Water phase separated from distillate | 0.15 |
| (7) Vapor sidestream withdrawn from tray 15 | 1.01 |
| (8) Column residue | 0.05 |

All the above flow rates are measured as liquid at ambient temperature.

The alpha-methylstyrene content of Stream 3 listed above was 1.3 weight percent and of Stream 4 it was 77 parts per million. Of the other streams, the alpha-methylstyrene content was 116 parts per million in Stream 5, 38 parts per million in Stream 6, 116 parts per million in Stream 7, and in excess of 1 weight percent in Stream 8. In addition, Stream 1 contained approximately 77 parts per million of alpha-methylstyrene as a result of the fact that the vapor sidestream withdrawn from tray 15 (Stream 7) was recycled to the ethylene oxidation reaction system with the result that the crude reaction product returned to the instant distillation column in Stream 1 contained alpha-methylstyrene.

It will be noted from the above that the alpha-methylstyrene, by virtue of its volatility, disperses to some extent throughout the entire distillation system, providing substantial protection against polymerization in zones which would not be protected when a non-volatile inhibitor such as hydroquinone is employed in the distillation column.

The distillate withdrawn from the column in Stream 5 contained, by weight, approximately 88% vinyl acetate, 9% acetaldehyde, 2% water, and the remainder minor organic contaminants including particularly methyl acetate. The crude vinyl acetate introduced onto tray 42 (Stream 1) contained, by weight, 22% vinyl acetate, 4% acetaldehyde, 7% water, 70% acetic acid, and the remainder various minor contaminants including chlorides and, particularly, methyl acetate and the acetates and diacetates of ethylene glycol and 1,1-ethanediol. Stream 2 introduced into the column at tray 20 contained, by weight, approximately 6% acetaldehyde, 2% water, 87% acetic acid, and the remainder various minor contaminants characteristic of the crude product produced in the oxidation of acetaldehyde to acetic acid. The residue withdrawn from the column in Stream 8 contained approximately 80% acetic acid by weight, about 0.7% water, approximately 12% acetates of ethylene glycol and 1,1-ethanediol, and lesser quantities of other contaminants including high-boiling or non-volatile chlorides which were present in minor amounts in the streams introduced on tray 42.

With the distillation tower operating in the above manner no perceptible fouling by polymer was experienced in the tower itself during extended periods of operation. Some fouling was experienced in the reboiler, but the degree of reboiler fouling encountered when using alpha-methylstyrene in this manner was substantially the same as when employing hydroquinone as polymerization inhibitor. With no inhibitor at all, fouling of the reboiler was so severe that the column could be operated no longer than a few hours before cleaning of the entire reboiler surface was required.

EXAMPLE II

Two distillation towers having a total of 150 trays were operated in series as the equivalent of a single 150-tray column. Head pressure was approximately 1 p.s.i.g., and base pressure was approximately 14 p.s.i.g. Feed was introduced onto trays 77 and 85, and reflux was returned to tray 150. Feedstock was a crude vinyl acetate containing approximately 98% vinyl acetate and 2% higher-boiling esters, predominantly ethyl acetate and isopropyl formate. Per square foot of distillation column cross-section, the feed rate was 0.72 U.S. gallon per minute. Reflux rate, computed on the same basis, was 5.0 gallons per minute, residue draw-off rate was 0.23 gallon per minute, and overhead product rate of 0.70 gallon per minute. The distillate comprised predominantly vinyl acetate (99.7% pure), and the residue comprised a mixture of vinyl acetate with ethyl acetate and isopropyl formate.

With the distillation system operating as just described alpha-methylstyrene was fed into the head of the column by incorporating it, in a concentration of 100 p.p.m., into the reflux entering the column. Fouling was minimal, being no more rapid than when phenothiazine was employed in the same column under the same operating conditions. Satisfactory operating results obtained under the same schedule of periodic cleaning as had been found to be necessary when employing phenothiazine inhibitor. Such fouling as did occur was largely in the reboiler. With no inhibitor at all, this same distillation apparatus could not be operated for more than a few hours before excessive fouling by vinyl acetate polymer required that it be shut down for cleaning.

The embodiments of the invention in which an exclusive property or privilege is claimed are defined as follows:

1. In a process for distilling a feedstock comprising vinyl acetate, which process comprises introducing said feedstock onto a distillation column within which a downwardly-flowing liquid comprising vinyl acetate is contacted countercurrently with an ascending stream of vapor rising from the base of said column, the improvement which comprises inhibiting the polymerization of vinyl acetate within said column by incorporating alpha-methylstyrene into said downwardly-flowing liquid within said column.

2. The improvement of claim 1 wherein the alpha-methylstyrene is incorporated into said liquid by continuously introducing said alpha-methylstyrene into said distillation column at a level above the point of feedstock injection.

3. The improvement of claim 2 wherein the alpha-methylstyrene is injected into the distillation column at such a rate as to maintain in the liquid flowing downwardly through said column an alpha-methylstyrene concentration of at least about 5 parts per million by weight.

4. The improvement of claim 3 wherein the vinyl acetate is withdrawn from the head of the column as distillate and the alpha-methylstyrene is injected into the top of said column together with a reflux stream comprising predominantly vinyl acetate, at the rate of at least about 25 parts by weight of alpha-methylstyrene per million parts of reflux.

5. The improvement of claim 4 further characterized in that the distillation feedstock comprises vinyl acetate and acetic acid, substantially the entirety of the vinyl acetate being withdrawn as distillate.

6. The improvement of claim 4 further characterized in that the feedstock contains water, the bulk of which is distilled overhead as the vinyl acetate-water azeotrope.

7. The improvement of claim 4 further characterized in that the feedstock comprises vinyl acetate and ethyl acetate.

References Cited
UNITED STATES PATENTS

| | | | |
|---|---|---|---|
| 2,336,493 | 12/1943 | Marks | 260—499 |
| 3,467,696 | 9/1969 | Naito et al. | 260—499 |

WILBUR L. BASCOMB, JR., Primary Examiner

U.S. Cl. X.R.

203—69; 260—497, 499